United States Patent [19]

Wilkins

[11] Patent Number: 5,606,933

[45] Date of Patent: Mar. 4, 1997

[54] AGAR-PLASTIC FOAM BIRD FEEDER AND PROCESS

[76] Inventor: Judd R. Wilkins, 281 Littletown Quarter, Williamsburg, Va. 23185

[21] Appl. No.: 394,245

[22] Filed: Feb. 24, 1995

[51] Int. Cl.⁶ .................................................. A01K 5/00
[52] U.S. Cl. ................................................ 119/51.03
[58] Field of Search ...................... 119/51.01, 51.03, 119/51.5

[56] References Cited

U.S. PATENT DOCUMENTS

| | | |
|---|---|---|
| 148,632 | 3/1874 | Thompkins . |
| 2,961,994 | 11/1960 | Kopietz . |
| 3,094,100 | 6/1963 | Wise ................................. 119/51.03 |
| 3,122,129 | 2/1964 | Wise . |
| 3,964,438 | 6/1976 | Rodemeyer ....................... 119/51.03 |
| 5,025,753 | 6/1991 | Schneider .......................... 119/51.03 |
| 5,033,708 | 7/1991 | Brue . |
| 5,052,342 | 10/1991 | Schneider .......................... 119/51.03 |
| 5,076,214 | 12/1991 | Petit ................................... 119/51.03 |
| 5,174,581 | 12/1992 | Goodson . |
| 5,270,064 | 12/1993 | Shultz . |

*Primary Examiner*—Thomas Price
*Attorney, Agent, or Firm*—Wallace J. Nelson

[57] ABSTRACT

An ornamental bird feeder composed of a plastic foam disk saturated with a melted agar that has one of more surfaces thereof covered with bird seed before the agar is permitted to cool to a gel state to entrap the bird seed. A hanging tab consisting of a length of wire has one end thereof embedded within the plastic disk with the other end serving to support the bird feeder from an overhead structure. Suitable food color may be added to the agar while in the liquid state for aesthetic and bird attracting properties. Conventional muffin pan molds may be employed or the molds may be custom made in the desired shapes by hand forming the mold(s) from aluminum foil.

18 Claims, 2 Drawing Sheets

AGAR-PLASTIC FOAM BIRD FEEDER AND PROCESS

FIELD OF THE INVENTION

This invention relates to bird feeders in general and relates specifically to a bird feeder formed of a porous plastic core saturated with agar, and containing an exterior surface of agar embedded bird seed, and the process of making same.

BACKGROUND OF THE INVENTION

Bird feeders can generally be divided into three groups. The most common type is a platform and a wide variety of designs are available in this group, with the simplest form being a square or rectangular piece of wood, or plastic, mounted on a pole or attached to a tree, house, or other structure. Other platform feeders have a roof with an inside sheet of glass or plastic in which seeds of various types are gravity fed to the platform floor. Plastic feeders range in shape from a tube with a series of holes and perches, to a circular form with a hood and a receptacle for holding feed.

Suet feeders consist of rendered beef fat to which bird seed and raisins are added before the suet is allowed to solidify. The usual suet shape is a 4×4×1 inch block placed in a wire mesh cage or net bag. Suet feeders are also available in a bell shape.

Hummingbird feeders concentrate on providing a heavily sugared liquid, usually red in color. These feeders consist primarily of a glass or plastic container outfitted with one or more bent protuberances or snouts to accommodate the beak of the hummingbirds.

It is an object of the present invention to provide a unique bird feeder that is easy to construct, simple to maintain, and economic to use.

Another object of the present invention is to employ a bird feeder that combines the unique qualities of agar and porous plastic foam in its construction and use.

An additional object of the present invention is a simplified process of constructing a durable low cost bird feeder.

A still further object of the present invention is an ornamental bird feeder that performs the dual function of being useful as a tree decoration (indoors or outdoors) and as a bird feeder.

SUMMARY OF THE INVENTION

According to the present invention, the foregoing and additional objects are attained by providing a bird feeder adapted to be suspended from an overhead object and including a porous foam plastic core saturated with an agar gel and having a layer of bird seed embedded in the agar on at least a portion of the exterior surface of the plastic core. An elongated hanging tab is provided for the bird feeder by embedding one end thereof within the plastic core and leaving the other end exposed to permit suspension of the bird feeder from an overhead object. The process of making the bird feeder involves providing a porous foam plastic material disk, trimmed to the shape desired for the bird feeder, securing one end of a hanging tab within the trimmed foam plastic, positioning the trimmed foam plastic in a suitable open mold previously provided with a layer of bird seed therein, and adding a quantity of melted agar to the open mold. The top and sides of the trimmed plastic disk may then be covered with a layer of bird seed and additional agar solution added to completely embed and saturate the plastic core in agar. A suitable weight is employed to maintain the light weight foam material immersed in the agar until the agar is permitted to solidify at room temperature. Suitable food coloring may be added to the agar for aesthetic decorative purposes.

BRIEF DESCRIPTION OF THE DRAWINGS

A more complete appreciation of the invention and many of the attendant advantages thereof will be more readily apparent as the same becomes better understood in reference to the accompanying drawings wherein.

DETAILED DESCRIPTION

Figure 1:
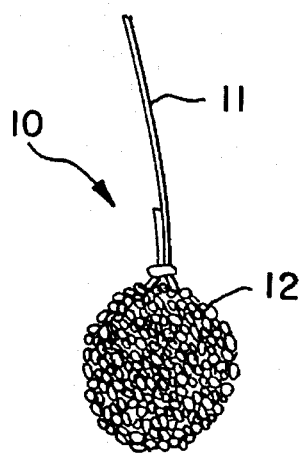
FIG. 1 is a front view of an exemplary bird feeder of the present invention.

Referring now to the drawings, an exemplary bird feeder, according to the present invention is shown and designated generally by reference numeral 10. As shown therein, bird feeder 10 is provided with an elongated hanging tab 11 secured thereto and extending therefrom. A coating layer of bird seed 12 is provided on the exterior surface of bird feeder 10.

Figure 2:
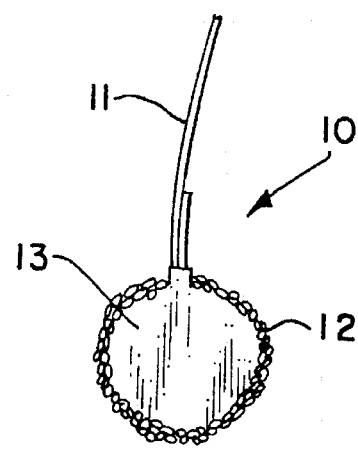
FIG. 2 is a rear view of the bird feeder shown in FIG. 1.

As shown in FIG. 2, the rear view of bird feeder 10 reveals a porous foam plastic disk 13 serving to support the elongated hanging tab 11 and the layer of bird seed 12 on bird feeder 10. Porous disk 13 may also be completely covered with a layer of bird seed 12, as will be further explained hereinafter.

Figure 3:
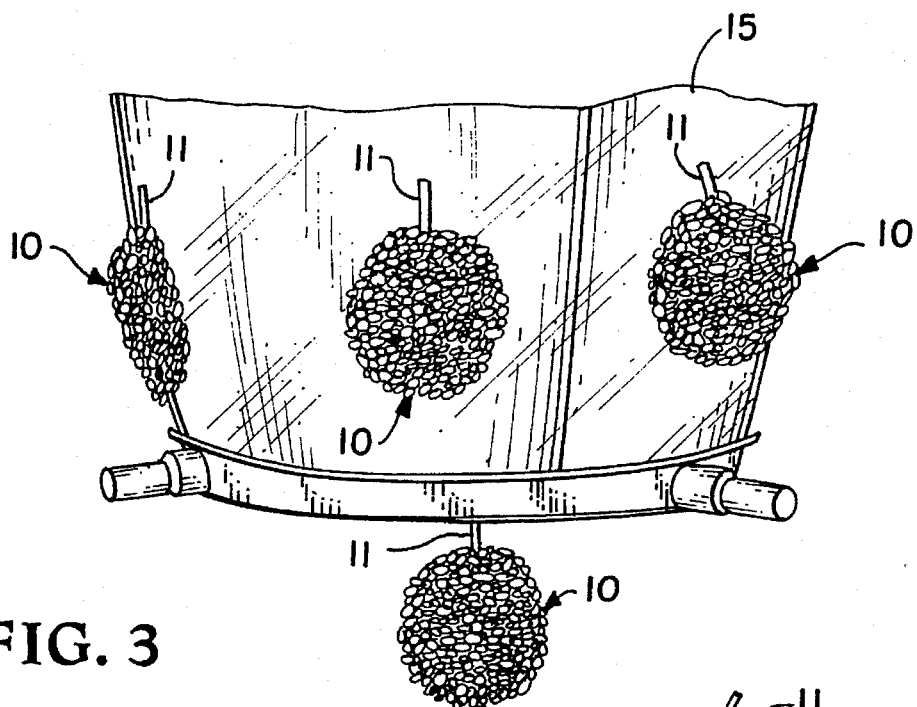
FIG. 3 is a part schematic view of a plurality of bird feeders of the present invention suspended from a conventional bird feeder.

FIG. 3 illustrates a plurality of bird feeders 10 suspended by their respective hanging tabs 11 from a conventional plastic bird feeder 15. Each of bird feeders 10 may be provided with a different variety of bird seed to attract different bird species, or the entire group of feeders 10 may be constructed of bird seed that are known to be attracted to one or more selected species of birds.

Figure 4:
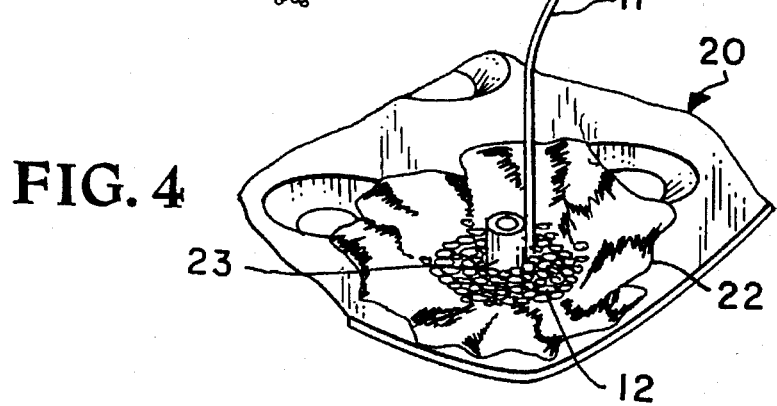
FIG. 4 is a schematic view of a muffin pan mold employed to make a bird feeder according to the present invention.

FIG. 4 illustrates an exemplary open mold that may be employed to construct the bird feeders 10 of the present invention. As shown therein, a conventional muffin pan mold 20 may be employed in practice of the present invention. Although only one mold cavity in pan mold 20 is shown as being used, any number of the open molds in pan 20 may be employed as so desired. In the illustrated embodiment an open mold cavity in pan 20 is lined with an aluminum foil layer 22, the porous foam plastic disk, with elongated hanging tab 11 extending therefrom, is positioned within the mold cavity, with a lead weight 23 positioned on top of the plastic disk, as will be further explained hereinafter.

Figure 5:
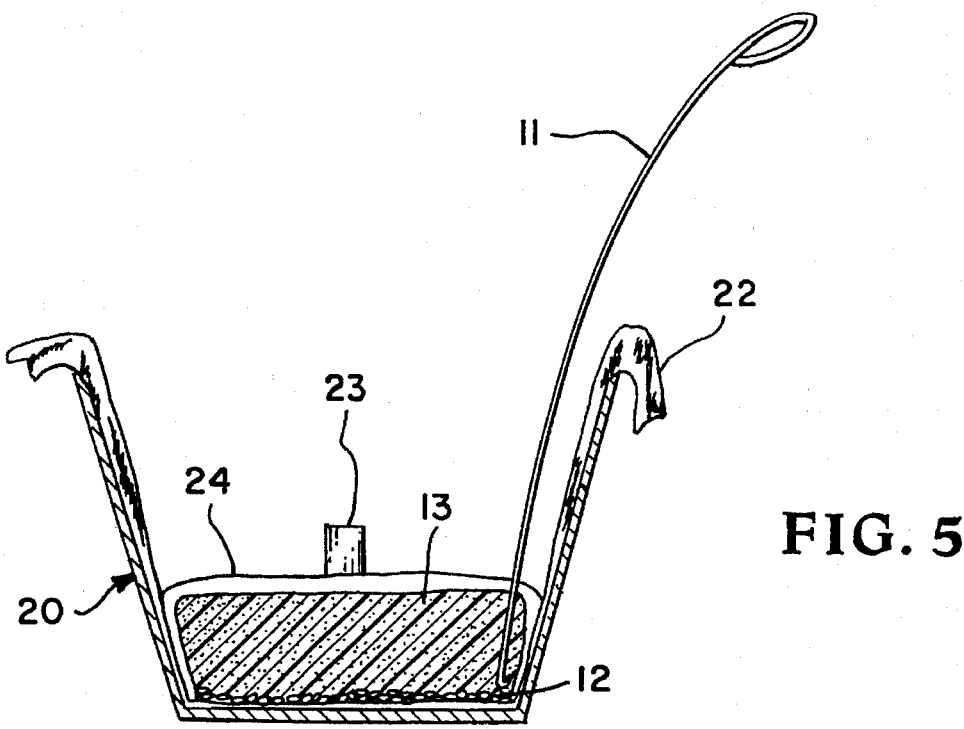
FIG. 5 is sectional view of the open mold shown in FIG. 2 with a bird feeder according to the present invention being molded therein.

Referring now to FIG. 5, a sectional view of the mold 22 shown in FIG 4 is illustrated. As shown therein, a layer of suitable bird seed 12 is deployed within the mold cavity 20, now defined by the aluminum foil 22, and a porous foam plastic disk 13, trimmed in the shape of and slightly smaller than, the mold cavity is placed therein over the layer of bird seed, and with the elongated hanging tab 11 extending therefrom. A melted agar solution 24 is then poured into the mold cavity in sufficient quantity to entirely cover the entire surface, or at least cover one-half of the thickness, of the plastic disk therein. Lead weight 23 is placed on top of the porous foam plastic disk 13 to retain it against the layer of bird seed while the agar is in solution state. In some instances the bird seed will be disposed only on the bottom of the mold, while in others, it may be desirable to have the bird seed on the sides of the porous foam plastic disk 13, as shown in this FIG as well as in FIGS. 1 and 2. Also, and as will be discussed further hereinafter, it may also be desirable to provide the bird seed over the front and back of the porous foam plastic disk, with the sides thereof being either covered with the bird seed or left coated only with the agar, as illustrated in FIGS. 6 and 7.

Figure 6:
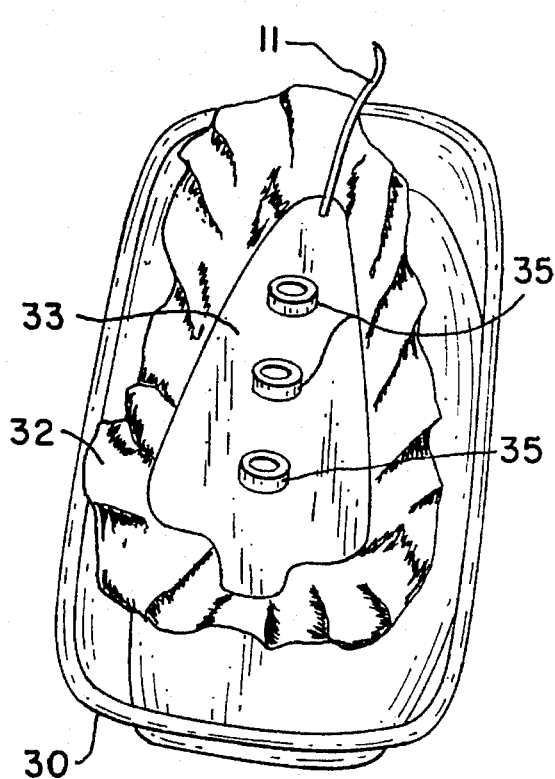
FIG. 6 is view of a different open mold as employed to construct a different shape bird feeder according to the present invention.

Referring now more particularly to FIG. 6 there is shown a flat glass vessel 30 housing an aluminum foil open mold 32 therein. Mold 32 is hand pressed to fit the contour of a porous foam plastic core 33 for a bird feeder. As in the previous described embodiments, a hanging tab 11 in the form of an elongated wire is provided with one end thereof embedded within the plastic core 33 and the other end extending from the mold cavity 32. At least one, and in the illustrated embodiment three, small lead weight(s) 35 are disposed on the top surface of plastic core 33 to maintain the core against the bottom surface of the mold in contact with a layer of bird seed placed therein. Plastic core 33 in this embodiment is in the form of a simulated evergreen tree. The melted agar solution is poured into mold 32 in sufficient quantity to cover plastic core 33 and weights 35 added thereto to apply sufficient pressure on the mold core to retain it in contact with the bottom bird seed layer. An additional layer of bird seed is then added to the top of the plastic core 33 and, upon cooling, the agar solidifies to provide a bird feeder 45 (FIG. 7).

Figure 7:
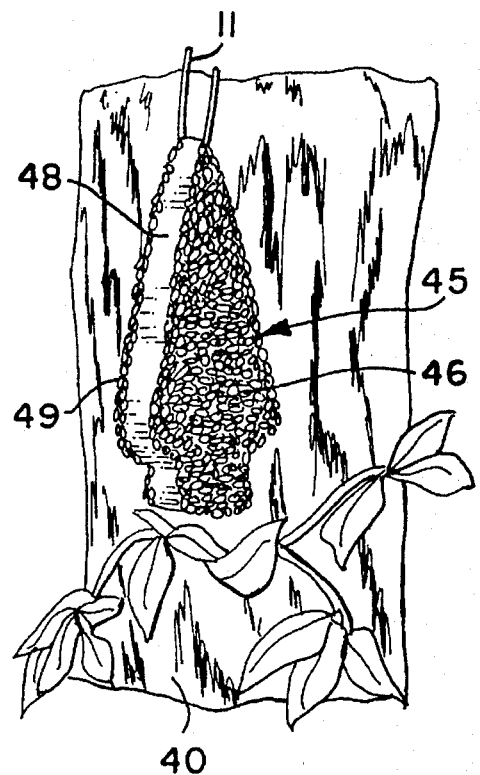
FIG. 7 is a schematic view of the bird feeder produced by the mold shown in FIG. 6 when suspended from a tree.

Referring to FIG. 7, the recovered tree-shaped bird feeder 45 is suitably supported by hanging tab 11 in a tree 40 where it is accessible to the bird population. As illustrated, bird feeder 45 is provided with front and rear surface coatings of bird seed embedded in the agar gel, as designated respectively, by reference numerals 46 and 49. The edge surfaces of this embodiment are not covered with bird seed and the exposed layer of agar thereon is visible and designated by reference numeral 48. Suitable food coloring, such a green color, is added to the agar gel to provide an attractive color to the bird feeder and to simulate the evergreen color.

Each of the bird feeders described herein have the functional capability of being employed as a Christmas tree ornament and with the tree being later moved outdoors with the feeders still attached, or the feeders may be attached to different trees, or other structure, to be used as an outdoor feeding site. Any suitable food or cake coloring may be employed in the agar solution to add aesthetics to the bird feeder, as well as to attract specific groups of birds.

Any materials suitable for the construction of the bird feeders described hereinabove are considered within the scope of the invention. For example, although agar was employed in the preferred embodiments described herein, other candidate gels useful for practice of the present invention include carboxymethyl cellulose, polyacrylamide and quar gum. Accordingly, the specific embodiments described herein are to be considered as exemplary and are not to be deemed as exhaustive.

One open mold cavity employed in the specific examples disclosed herein was a conventional muffin pan with twelve molds and used to fabricate the agar-plastic foam disk feeders of the present invention. Individual molds in the muffin pan employed measured 2 and ⅝ inch (66 mm) diameter at the opening with narrowing to 1 and ⅞ inch (48 mm) at the bottom, and with an inside depth of 1 and ½ inch (38 mm). In one embodiment, individual molds were lined by pressing aluminum foil against the sides and bottom to facilitate release of the molded bird feeder from the mold. When employing a Teflon coated muffin pan, the aluminum foil liner was found unnecessary and the agar molded bird feeder was easily removed therefrom by running a case knife around and between the edges of the molded bird feeder and the sides of the mold.

A layer of bird seed was formed on the bottom of each mold by the addition of approximately one table spoon of seed spread thereon. Approximately 10 ml of two percent (2.0 gr/100 ml water, w/v) melted agar was poured onto and allowed to thoroughly mix with the layer of seed in the mold. Agar is a polysaccharide isolated from seaweed as a yellowish-white powder and has the useful property of forming gels with water that melts at approximately 100 degrees C and solidifies or gels at approximately 45 degrees C. Agar is natural product that is commercially available from a number of supply houses under various trade names and BACTO agar, employed in the present invention was obtained from the Difco Laboratories, Detroit, Mich. The two percent agar solutions employed in the present invention were melted in a microwave oven (high setting) after approximately five minutes and cooled at room temperature to approximately 45–50 degrees C in twenty to thirty minutes.

One and one-half inch (38 mm) diameter disks were trimmed from 0.5 inch (12.5 mm) thick plastic foam and placed on the layer of bird seed-agar mixture. Each plastic disk was pierced with one end of a six to eight inch length of copper wire (18 gauge), with the remaining length of the wire serving as a hanging tab for the bird feeder. One or more, one to two ounce, lead weights were placed on each disk to maintain the plastic disk in the agar and to assist in force bonding between the plastic disk and the bird seed-agar mixture. The plastic polystyrene foam used in the examples described herein is widely available from fabric shops, such as Piece Goods Shops, Williamsburg, Va. where the foam plastic is available in a two foot width and thicknesses of 0.5 inch, 1.0 inch and 2.0 inch. The porous sponge-like qualities of the plastic foam make it a favorable substrate for the absorption of melted agar. Additional melted agar was then added to the molds, plus more bird seed, added to the sides of the plastic disk and/or to the sides thereof, and the mixture allowed to cool to room temperature (over a period of thirty to forty minutes) to effect gelling or solidification of the agar.

After five to six hours at room temperature, the solidified agar was removed from the mold and the aluminum foil (when employed) was stripped off. A smooth layer of bird seed was evident across the face of the plastic disk. With the passing of time as the disks were exposed to outdoor and indoor conditions and, as the agar began to desiccate, a strong bonding was noted between the bird seed and the agar saturated plastic disk.

The silhouette of an evergreen tree (FIGS. 6 and 7) demonstrates the versatility of the agar-plastic foam combination of the present invention in regards to shape, size, and color. In this embodiment, the tree outline was trimmed from 0.5 inch foam plastic and the procedure used for making the disks was followed with the exception that three drops of green food color (Durkee-French Foods) was added to the melted and cooled agar to give the bird feeder a green appearance. Other color could be employed as so desired.

In the embodiment of FIGS. 6 and 7 the bird seeds were not added to the side portions of the mold to permit the green colored agar to be more fully displayed.

In the embodiment of FIGS. 1 and 2, the bird seeds were confined to one side of the disk and the sides thereof with the other side being blank. This embodiment conserves bird seed as well as permits better display of the colored agar when used for decorative purposes, as well as for displaying specific colors to attract a particularly group of birds. In other embodiments described, the bird seeds are added to the sides and both surfaces of the plastic disk.

Thus, although the invention has been described relative to specific embodiments thereof, it is not so limited, and there are obviously many variations and modifications of the invention that will be readily apparent to those skilled in the art in the light of the above teachings.

It is therefore to be understood that, within the scope of the appended claims, the invention may be practiced other than as specifically described herein.

What is claimed as new and desired to be secured by Letters Patent of the United States is:

1. A bird feeder adapted to be suspended from an overhead object comprising:

a porous foam plastic disk having an exterior surface including a front, a back and a side surface area;

an agar gel material saturating at least part of said porous foam plastic core and providing an exterior agar gel surface over at least a portion of said exterior surface thereof;

said agar gel material having a quantity of bird seed retained therein over said at least a portion of said exterior surface of said porous foam plastic core; and a hanging tab having one end embedded within said porous plastic core and another end extending from said porous foam plastic core to permit suspension of said porous plastic core and agar gel containing bird seed from an overhead object.

2. The bird feeder of claim 1 wherein said agar gel material is formed of an agar solution having a melting point of approximately 100 degrees C. and a gelling temperature of approximately forty-five degrees C.

3. The bird feeder of claim 1 wherein said porous foam plastic disk is formed from a plastic polystyrene foam having a thickness in the range of 0.5 to 2.0 inches.

4. The bird feeder of claim 1 wherein said agar gel material is solidified from an approximately two percent agar gel solution.

5. The bird feeder of claim 1 wherein said exterior agar gel surface is disposed completely over said front, said back and said side surface areas, and wherein said bird seed retained in said agar gel covers at least said front and said back exterior surface areas of said porous foam plastic disk.

6. The bird feeder of claim 1 wherein said exterior agar gel surface completely covers said front, said back and said side surface areas of said porous foam plastic disk and, wherein said quantity of bird seed retained therein covers at least said front and said side surface areas of said porous foam plastic disk.

7. A method of making a hanging bird feeder comprising the steps of:

providing an open mold having a cavity in the shape of that desired for a bird feeder;

adding a quantity of bird seed to form a layer of bird seed within the bottom of the mold cavity;

employing a quantity of melted agar solution to cover the layer of bird seed and fill at least a portion of the mold cavity;

providing a porous foam plastic material disk in essentially the shape of the open mold cavity;

inserting the porous foam plastic material disk in the mold cavity containing the agar solution and bird seed;

embedding one end of an elongated wire within the porous foam plastic material disk and leaving one end of the elongated wire extending from the mold cavity;

applying pressure to the top of the porous foam plastic material disk to maintain it immersed within the melted agar solution and in contact with the layer of bird seed;

adding additional melted agar solution to the mold cavity to completely immerse the porous plastic foam material disk within the solution;

solidifying the melted agar solution by cooling at room temperature; and recovering a bird seed-agar coated porous plastic foam disk from the mold cavity to serve as a hanging bird feeder.

8. The method of making a hanging bird feeder as in claim 7 wherein the step of applying pressure to the top of the porous foam plastic material disk to maintain it immersed within the melted agar solution comprises placing at least one small lead weight to the top of the porous foam plastic material.

9. The method of making a hanging bird feeder as in claim 7 including the step of adding a small quantity of a food color to the melted agar solution to tailor the color of the recovered hanging bird feeder.

10. The method of making a hanging bird feeder as in claim 7 wherein the porous foam plastic material provided in the shape of the open mold cavity is selected from the shapes consisting of a circular disc and an essentially triangular tree shape.

11. The method of claim 7 wherein the open mold cavity is formed of aluminum foil shaped and sized to receive a specific size and shaped porous foam plastic material.

12. The method of claim 7 including the step of adding additional bird seed to the top of the porous foam plastic material disk after the porous plastic foam material disk is completely immersed in the agar solution.

13. The method of claim 7 including the step of adding additional bird seed to the top and sides of the porous plastic foam material disk while the agar is in the solution state.

14. A bird feeder comprising:

a porous foam plastic body having an exterior surface;

a gel saturating at least part of said porous foam body and covering at least part of the exterior plastic body surface;

a plurality of bird seed embedded within the gel covering at least part of the exterior surface of said porous foam plastic body; and an elongated hanging tab capable of supporting the weight of said porous foam plastic body and having one end thereof embedded within said porous foam plastic body and another end extending from said porous foam plastic body.

15. The bird feeder of claim 14 said gel is formed of an agar solution having a melting point of approximately 100 degrees C. and a gelling temperature of approximately forty-five degrees C.

16. The bird feeder of claim 14 wherein said agar gel is solidified from an approximately two percent agar solution.

17. The bird feeder of claim 14 wherein said porous foam plastic is formed from a plastic polystyrene foam having a thickness in the range of 0.5 to 2.0 inches.

18. The bird feeder of claim 14 wherein said gel is selected from the group of gels consisting of agar, carboxymethyl cellulose, polyacrylamide, and guar gum.

* * * * *